(12) United States Patent
Adragna (10) Patent No.: US 10,461,658 B2
(45) Date of Patent: *Oct. 29, 2019

(54) CONTROL DEVICE OF A SWITCHING POWER SUPPLY

(71) Applicant: STMICROELECTRONICS S.R.L., Agrate Brianza (IT)

(72) Inventor: Claudio Adragna, Monza (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/452,173

(22) Filed: Mar. 7, 2017

(65) Prior Publication Data

US 2017/0179845 A1 Jun. 22, 2017

Related U.S. Application Data

(63) Continuation of application No. 13/191,282, filed on Jul. 26, 2011.

(30) Foreign Application Priority Data

Jul. 27, 2010 (IT) .............................. MI2010A1378

(51) Int. Cl.
*H02M 7/06* (2006.01)
*H02M 1/42* (2007.01)
(Continued)

(52) U.S. Cl.
CPC ............... *H02M 7/06* (2013.01); *H02M 1/08* (2013.01); *H02M 1/42* (2013.01); *H02M 1/4225* (2013.01);
(Continued)

(58) Field of Classification Search
CPC ............ H02M 3/00; H02M 3/02; H02M 3/04; H02M 3/10; H02M 3/145; H02M 3/155;
(Continued)

(56) References Cited

U.S. PATENT DOCUMENTS

| 5,367,247 | A | 11/1994 | Blocher et al. |
| 5,479,336 | A | 12/1995 | Motoki et al. |

(Continued)

FOREIGN PATENT DOCUMENTS

EP  1 387 476 A1  2/2004

OTHER PUBLICATIONS

Adragna, "Control Loop Modeling of L6561-Based TM PFC," Application Note AN1089, STMicroelectronics, Mar. 2000, 12 pages.

(Continued)

*Primary Examiner* — Gary L Laxton
*Assistant Examiner* — Carlos O Rivera-Perez
(74) *Attorney, Agent, or Firm* — Seed Intellectual Property Law Group LLP (57) ABSTRACT

A control device controls a switching converter having an input alternating supply voltage and a regulated direct voltage at the output terminal. The converter comprises a switch and the control device is adapted to control the on time period and the off time period of said switch for each cycle. The control device has a first input signal representative of the current flowing through at least one element of the converter and comprises a zero crossing detector adapted to detect at least one pair of first and second zero crossings of said first signal for each switching cycle, said second zero crossing immediately following the first zero crossing and occurring in opposite direction with respect to the first zero crossing. The control device comprises a synchronizer (Continued)

adapted to synchronize the start of the on period with each second zero crossing of said first signal.

23 Claims, 10 Drawing Sheets

(51) Int. Cl.
*H02M 1/08* (2006.01)
*H02M 1/00* (2006.01)
(52) U.S. Cl.
CPC ............... *H02M 2001/0009* (2013.01); *H02M 2001/0058* (2013.01); *Y02B 70/126* (2013.01); *Y02B 70/1491* (2013.01)
(58) Field of Classification Search
CPC .... H02M 3/156; H02M 3/1563; H02M 3/157; H02M 3/158; H02M 3/1582; H02M 3/1588; H02M 7/02; H02M 7/06; H02M 7/12; H02M 1/08; H02M 1/083; H02M 1/42; H02M 1/4208; H02M 1/4216; H02M 1/4225; H02M 1/4241; H02M 1/425; H02M 1/4291; H02M 1/4258; H02M 2001/0009; H02M 2001/0016; H02M 2001/0025; H02M 2001/0038; H02M 2001/0048; H02M 2001/0032; H02M 2001/0054; H02M 2001/0058; H02M 2003/1552; H02M 2003/1566; H02M 2003/22; H02M 2003/325; H02M 2003/33507; H02M 2003/33515; H02M 2003/33523; H02M 7/10; H02M 7/21; H02M 7/217; Y02B 70/00; Y02B 70/10; Y02B 70/12; Y02B 70/123; Y02B 70/126; Y02B 70/14; Y02B 70/1491
USPC ................ 363/15–21.18, 44, 74, 78, 79, 89, 363/123–127; 323/205–211, 222–226, 323/235, 236, 238, 271–278, 280, 323/282–288, 299, 319, 321, 351; 327/172–180
See application file for complete search history.

(56) References Cited

U.S. PATENT DOCUMENTS

| | | | |
|---|---|---|---|
| 5,742,151 A | 4/1998 | Hwang | |
| 6,191,565 B1 | 2/2001 | Lee et al. | |
| 6,259,614 B1 | 7/2001 | Ribarich et al. | |
| 6,307,361 B1 | 10/2001 | Yaakov et al. | |
| 6,469,917 B1* | 10/2002 | Ben-Yaakov | ....... H02M 1/4225 323/222 |
| 6,842,353 B2 | 1/2005 | Yamada et al. | |
| 7,042,743 B2 | 5/2006 | Pidutti et al. | |
| 7,106,038 B1 | 9/2006 | Xin-LeBlanc | |
| 7,239,120 B2 | 7/2007 | Adragna et al. | |
| 7,307,405 B2 | 12/2007 | Adragna et al. | |
| RE40,016 E | 1/2008 | Ribarich et al. | |
| 7,345,464 B2 | 3/2008 | Steele | |
| 7,541,795 B1 | 6/2009 | Smith et al. | |
| 7,592,791 B2 | 9/2009 | Emira | |
| 7,863,828 B2 | 1/2011 | Melanson | |
| 7,884,588 B2 | 2/2011 | Adragna et al. | |
| 8,040,703 B2 | 10/2011 | Melanson | |
| 8,270,190 B2 | 9/2012 | Adragna | |
| 8,467,209 B2 | 6/2013 | Adragna | |
| 2004/0095101 A1 | 5/2004 | Pidutti et al. | |
| 2004/0263140 A1 | 12/2004 | Adragna et al. | |
| 2006/0013026 A1 | 1/2006 | Frank et al. | |
| 2006/0022648 A1 | 2/2006 | Ben-Yaakov et al. | |
| 2006/0208789 A1 | 9/2006 | Shimada | |
| 2008/0246444 A1 | 10/2008 | Shao et al. | |
| 2008/0272748 A1 | 11/2008 | Melanson | |
| 2008/0304195 A1 | 12/2008 | Lin | |
| 2009/0141524 A1 | 6/2009 | Fagnani et al. | |
| 2010/0110593 A1 | 5/2010 | Kim et al. | |
| 2010/0165683 A1 | 7/2010 | Sugawara | |
| 2010/0225290 A1* | 9/2010 | Nalbant | ................ H02M 3/156 323/282 |
| 2010/0315838 A1 | 12/2010 | Mao et al. | |
| 2011/0157940 A1 | 6/2011 | Zhang | |
| 2011/0175587 A1 | 7/2011 | Hosotani | |
| 2012/0026765 A1* | 2/2012 | Adragna | ............. H02M 1/4225 363/78 |
| 2012/0262082 A1 | 10/2012 | Esaki et al. | |

OTHER PUBLICATIONS

Huber et al., "Effect of Valley Switching and Switching-Frequency Limitation on Line-Current Distortions of DCM/ CCM Boundary Boost PFC Converters," *IEEE Transactions on Power Electronics* 24(2):339-347, Feb. 2009.

Kim, "Variable On-time Control of the Critical Conduction Mode Boost Power Factor Correction Converter to Improve Zero-crossing Distortion" *IEEE PEDS* pp. 1542-1546, 2005.

Langeslag et al., "VLSI Design and Application of a High-Voltage-Compatible SoC-ASIC in Bipolar CMOS/ DMOS Technology for AC-DC Rectifiers, "*IEEE Transactions on Industrial Electronics* 54(5):2626-2641, Oct. 2007.

ON Semiconductor, Product Note entitled: "Compact Fixed Frequency Discontinuous or Critical Conduction Voltage Mode Power Factor Correction Controller," NCP1601A, NCP1601B, 18 pages,© Semiconductor Components Industries, LLC, Jul. 2009—Rev. 5.

Renesas, Product Note entitled: "Critical Conduction Mode PFC Contra 1 IC," R2A20113 SP, REJ03F0279-0200, Rev.2.00, Jul. 8, 2009.

Unitrode Integrated Circuits, Product Note entitled: "High Power-Factor Preregulator," UC1852, UC2852, UC3852, 10pages, Texas Instruments © 2008.

* cited by examiner

CONTROL DEVICE OF A SWITCHING POWER SUPPLY

BACKGROUND

Technical Field

The present disclosure relates to a control device of a switching power supply.

Description of the Related Art

It is generally known to use devices for actively correcting the power factor (PFC) of switching power supplies used in electronic apparatuses of common use, such as computers, televisions, monitors, etc. and for supplying power to fluorescent lamps, i.e., switching pre-regulator stages which must absorb a current from the power line, said current is quasi-sinusoidal and phased with the supply voltage. A switching power supply of the current type thus comprises a PFC and a DC-DC converter connected to the PFC output.

A typical switching power supply comprises a DC-DC converter and an input stage connected to the power distribution line which comprises a full-wave diode rectifier bridge and a capacitor connected downstream so as to produce a non-regulated direct voltage from the sinusoidal alternating supply voltage. The capacitor has a great enough capacitance for a relatively small ripple being present at its terminals as compared to a direct level. Therefore the rectifier diodes of the bridge will only conduct over a short portion of each half cycle of the supply voltage, as the instantaneous value thereof is less than the voltage of the capacitor over most of the cycle. The result is the current absorbed by the power line consists of a series of short impulses the amplitude of which is 5-10 times the resulting average value.

This has significant consequences: the current absorbed from the power line has peak and rms (root-mean-square) values much higher than the case of sinusoidal current absorption, the supply voltage is distorted due to the almost simultaneous impulse absorption of all utilities connected to the power line, the current in the neutral conductor in the case of three-phase systems is highly increased and there is low use of the energy potentials of the power system. In fact, the waveform of impulse current includes many odd harmonics, which although they do not contribute to the power provided to the load, they contribute to increasing the rms current absorbed by the power line and therefore to increasing the energy dissipation.

In quantitative terms, this may all be expressed both in terms of power factor (PF), intended as ratio of the real power (the one the power supply sends to the load plus the one dissipated therein in the form of heat) to the apparent power (the product of the rms voltage by the rms current absorbed), and in terms of total harmonic distortion (THD), generally intended as percentage ratio of the energy associated with all larger harmonics to the one associated with the fundamental harmonic. Typically, a power supply with capacitance filter has a PF between 0.4 and 0.6 and a THD higher than 100%.

A PFC arranged between the rectifier bridge and the input of the DC-DC converter allows a current quasi sinusoidal and phased with the voltage, to be absorbed from the network, thus making the PF close to 1 and decreasing the THD.

Figure 1:
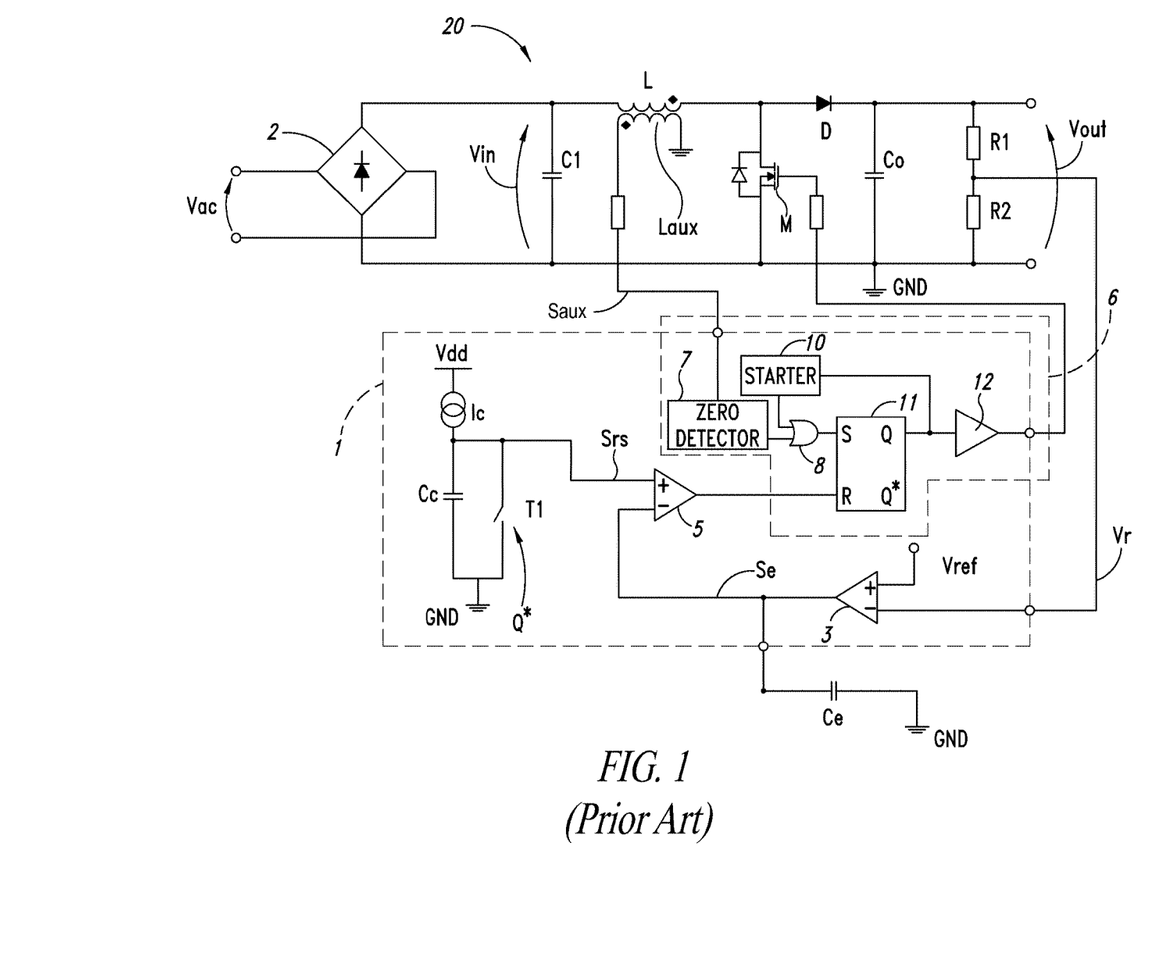
FIG. 1 shows a control device of a switching power supply in accordance with the known art.

FIG. 1 schematically shows a PFC pre-regulator stage comprising a boost converter 20 and a control device 1. The PWM control device has a variable frequency, also called "Transition Mode" (TM) as the device works on the borderline between the continuous (CCM) and discontinuous (DCM) modes of conducting current through the inductor; in particular, device 1 is of the constant Ton type. According to this method, the turn-on period of the power transistor is used as a control variable and, during each cycle of the supply voltage, it is kept constant to obtain the regulation of the voltage output from the converter 20 by means of a feedback control loop. The boost converter 20 comprises a full-wave diode rectifier bridge 2 having an input supply voltage Vac, a capacitor C1 (which serves as a high frequency filter) having a terminal connected to the diode bridge 2 and the other terminal connected to ground GND and on which a voltage Vin exists, an inductance L connected to a terminal of the capacitor C1, a MOS power transistor M having the drain terminal connected to a terminal of the inductance L downstream of the latter and having the source terminal connected to ground GND, a diode D having the anode connected to the common terminal of the inductance L and the transistor M, and the cathode connected to a capacitor Co having the other terminal connected to ground GND. The boost converter 20 generates an output direct voltage Vout across the capacitor Co which is higher than the maximum peak supply voltage, typically 400 V for systems powered by means of European power line or universal power line. Such a voltage Vout will be the input voltage of the DC-DC converter connected to the PFC.

The control device 1 should keep the output direct voltage Vout at a constant value by means of a feedback control action. The control device 1 comprises an operational error amplifier 3 adapted to compare part of the output voltage Vout, i.e., the voltage Vr given by $Vr=R2 \times Vout/(R2+R1)$ (where the resistances R1 and R2 are connected in series to each other and the series is in parallel to the capacitor Co) with a reference voltage Vref, e.g., of the value of 2.5 V, and generates an output error signal Se across a capacitor Ce connected between the output of amplifier 3 and ground GND.

The error signal Se is sent to the inverting input of a PWM comparator 5 while the signal Srs exists at the non-inverting input; the signal Srs is a voltage ramp across a capacitor Cc powered by a current generator Ic in the time periods whenever the switch T1 is open, which coincide with those when M is on as precisely the duration Ton of the turn-on of M is to be controlled. If signals Srs and Se are equal, the comparator 5 sends a signal to a control block 6 adapted to control the transistor M and which, in this case, turns it off. Block 6 comprises a zero current detecting block 7 having at the input the signal Saux deriving from the inductor Laux coupled with the inductor L; the signal Saux is representative of the demagnetization of the core of the transformer formed by the inductances L and Laux. Block 7 is capable of sending an impulse signal to a OR gate 8, the other input of which is connected to a starter 10, adapted to send a signal to the OR gate 8 at the initial instant of time; the output signal S of the OR gate 8 is the set input S of a set-reset flip-flop 11 having another input R which is the signal at the output from the comparator 5, and having an output signal Q and an output signal Q* which is the negated signal Q. The signal Q is sent to the input of a driver 12 which controls the turn-on or turn-off of the transistor M and therefore the duration of the turn-on time period Ton and the turn-off time period Toff in each switching cycle Tsw while the signal Q* controls the closing and opening of switch T1.

BRIEF SUMMARY

One embodiment of the present disclosure is a control device of a switching power supply.

One embodiment is a control device of a switching converter, said converter having an input alternating supply voltage and a regulated voltage at the output terminal, said converter comprising a switch and said control device being adapted to control the on and off time period of said switch for each cycle, said control device having a first input signal representative of the current flowing through at least one element of the converter, said device comprising first means adapted to detect at least one pair of first and second zero crossings of said first signal for each switching cycle, said second zero crossing immediately following the first zero crossing and occurring in opposite direction with respect to the first zero crossing, characterized in that it comprises further means adapted to synchronize the start of the on time period of the switch with each second zero crossing of said first signal.

BRIEF DESCRIPTION OF THE SEVERAL VIEWS OF THE DRAWINGS

The features and advantages of the present disclosure will become apparent from the following detailed description of practical embodiments thereof, shown by way of non-limiting examples in the accompanying drawings, in which.

DETAILED DESCRIPTION

Figure 2:
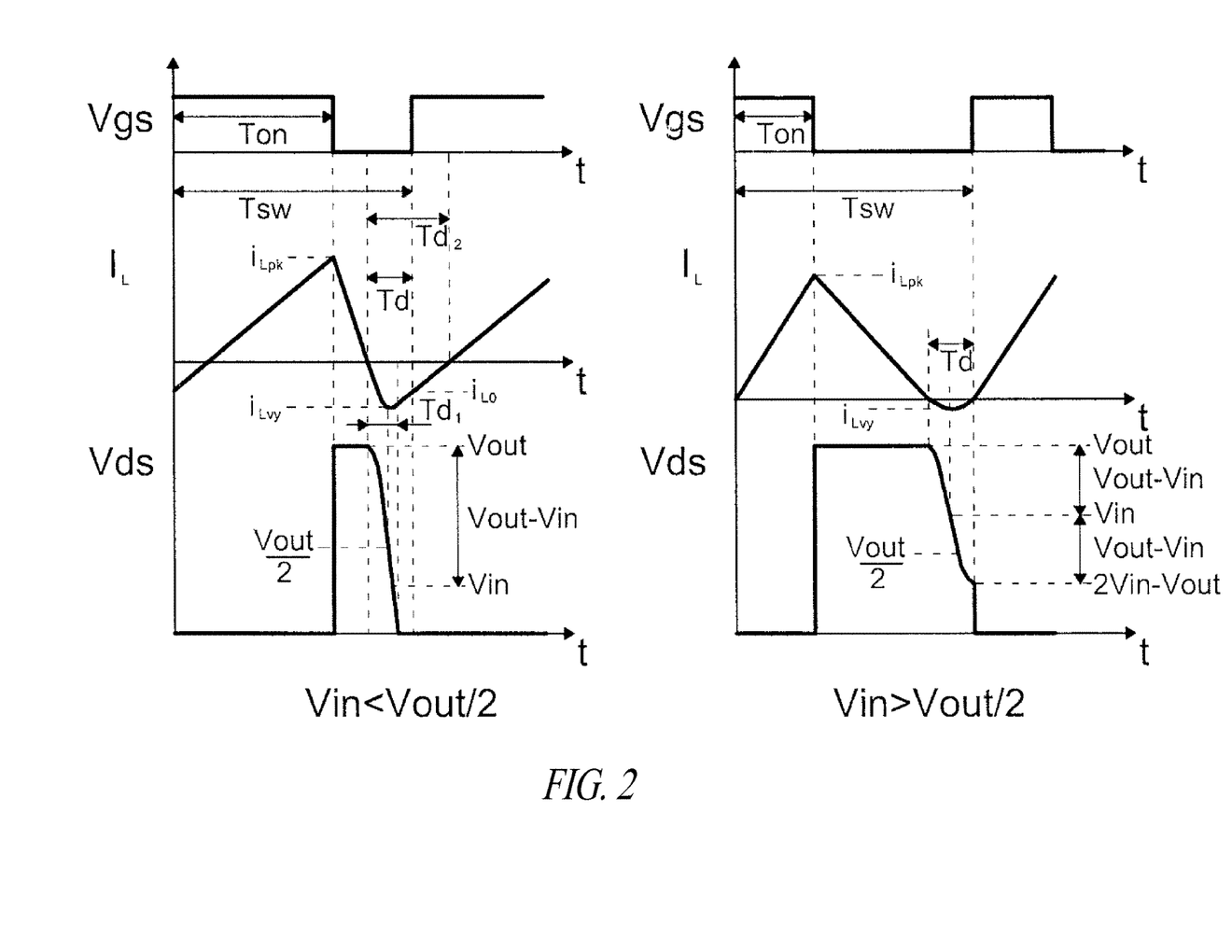
FIG. 2 shows the time diagrams of some signals involved in the circuit in FIG. 1 if Vin<Vout/2 or Vin>Vout/2.

FIG. 2 shows the time diagrams of some signals involved in the circuit in FIG. 1, i.e., the voltage between the gate and source terminals of transistor M Vgs, the voltage between the drain and source terminals of transistor M Vds and the current in inductor $I_L$.

In TM operation, operation is never exactly done at the borderline between DCM and CCM but slightly in DCM. In fact, the transistor M is not turned on when the current of the inductor is zeroed, as the voltage Vds in that moment is still equal to the output voltage Vout (typically 400 V); therefore, the parasitic capacitance Cd associated with the drain terminal in that moment has energy equal to $½·Cd·Vout^2$ which would be dissipated in the resistance $R_{DS(on)}$ of transistor M when it is turned on. If instead the turn-on is delayed until the oscillation of voltage Vds resulting from zeroing the current $I_L$ of the inductor reaches its minimum, equal to 2Vin−Vout, the power stored in the parasitic capacitance Cd and dissipated in the transistor M at the turning-on would be considerably reduced.

Moreover, if 2Vin−Vout<0 (i.e., Vin<Vout/2), where the body diode of transistor M substantially cuts the oscillation to zero, these energy losses would be zeroed resulting in the so-called "soft-switching". In part due to their operation and in part due to the introduction of intentional delays, zero current detection circuits or ZCD inside the controllers PFC, such as that shown in FIG. 1, allow the transistor M to be turned on at the drain oscillation valley ("valley switching"); this delay is indicated by Td, which is equal to half the period of said oscillation. This slightly moves the operation in DCM, but the remarks made on the pure TM are still valid, at least until Td is negligible with respect to the switching period, which typically occurs in a fairly large field of operating conditions of the converter if values Vin>>0 are considered, which are the significant ones in terms of the power transfer.

During the oscillation of voltage Vds, the current $I_L$ of inductor L becomes negative, by passing through the parasitic capacitance of transistor M and, also possibly the body of transistor M if the voltage Vds reaches zero and, thus, directly biases it.

In this latter case, shown in the left-hand time diagrams, the voltage Vds reaches zero after a time $Td_1$<Td; until that moment, the current $I_L$ of the inductor is sinusoidal, but from this moment on, due to the turning on of the body diode, which sets a voltage substantially equal to Vin at its terminals, it starts linearly increasing and at the instant Td is still negative. At this point, the transistor M (the voltage Vgs is forced high) is turned on and the direct current ramp starts. The current becomes positive at the instant $Td_2$>Td. Therefore, there is a time interval in which transistor M is turned on, but the current $I_L$ of the inductor is negative. It should be noted that, if the input voltage is such that the peak voltage Vpk is Vpk<Vout/2 (which occurs with the American or Japanese power line, for example), this time interval exists in the entire power line cycle. The ratio of the duration of this interval to that of the switching cycle becomes increasingly greater as the voltage Vin decreases, thus reaching the maximum at the zeroes of the supply voltage (Vin=0). In addition to this, as the current peak tends to zero when Vin tends to zero, the negative peak of the inductor current may even become higher than the positive peak around the zeros of the supply voltage.

If 2Vin−Vout>0 (i.e., Vin>Vout/2), the oscillation valley of the voltage Vds remains at a positive value and the body diode is not turned on. Therefore, the negative portion of the current of the inductor is entirely a sinusoidal arch and the current is zero at the instant Td when transistor M is turned on (i.e., $Td_2$=Td). Therefore, the time interval when the current is negative with the transistor M turned on is absent, but the negative peak of the inductor current (in this case of lower amplitude because the oscillation of voltage Vds is of lower amplitude) may be comparable to the positive peak around the zeroes of the supply voltage.

The current $I_L$ of the inductor linearly rises with a slope of $$\frac{dI_L}{dt} = \frac{Vin}{L}$$

in each turn-on cycle of transistor.

Since the input voltage is sinusoidal, Vin=Vpk sin θ where θ is the phase angle of the supply voltage, therefore:

$$\frac{dI_L}{dt}(\theta) = \frac{Vpk}{L}\sin\theta.$$

Considering the initial value $I_{L0}$ of the inductor current when transistor M is turned on, the peak value of the current of the inductor will be: $I_{Lpk}(\theta)=I_{L0}+Vpk/L \; Ton\cdot\sin\theta$, $I_{L0}=0$ if Vin>Vout/2 while, by neglecting the variation of current in the interval between Td/2 and $Td_1$, if Vin<Vout/2, $I_{L0}$ may be assumed to be equal to the negative peak $I_{Lvy}$ (which occurs at the instant Td/2), which is equal to:

$$I_{L0} \approx I_{Lvy} = \frac{Vin - Vout}{Zd} = \frac{Vpk\sin\theta - Vout}{Zd},$$

where Zd is the characteristic impedance of the resonant circuit consisting of the inductor and the parasitic capacitance on the drain terminal. Therefore, considering the preceding equations:

$$I_{Lpk}(\theta) = \begin{cases} -\frac{Vout}{Zd} + Vpk\sin\theta\left(\frac{1}{Zd} + \frac{1}{L}Ton\right) & Vpk\sin\theta < Vout/2 \\ \frac{Vpk}{L}Ton\cdot\sin\theta & Vpk\sin\theta \geq Vout/2 \end{cases}$$

Therefore with a constant period Ton, there is only a sinusoidal envelope of the peak current for instantaneous values of the supply voltage which are higher than Vout/2. There is a reduction of the peak value $I_{Lpk}(\theta)$ for values less than Vout/2 and, accordingly, a distortion of the envelope due to the constant term—Vout/Zd, which reduction is as great as said instantaneous voltage is low. It is obvious that said distortion results in the distortion of the mains current and therefore in a greater THD and a lower PF.

Furthermore, the reduction of the peak current has a further deleterious action on the THD: the increase of crossover distortion, seen as a brief flat zone in the waveform of the input current close to the zeroes of the supply voltage.

This distortion growing as the load of the PFC decreases and as the rms supply voltage increases, derives from the input-output energy transfer defect which occurs close to the zeros of the supply voltage. In that zone, the energy stored in the inductor—linked to the peak value of the current—is very low, insufficient to charge the parasitic capacitance Cd until reaching the voltage Vout (typically 400 V) so as to turn on the diode D and transfer the power of the inductor to the output. Therefore, the diode is not turned on over a certain number of switching cycles and the energy is partially returned to the filter capacitor arranged downstream the rectifier bridge. This is not discharged and keeps the bridge in inverse bias, by deleting the input current and performing a dead zone in the waveform of the line current.

The fact that the peak current for a given Ton is lower than the one expected in the region wherein Vin<Vout/2, results that the power transported around the zeroes of the supply voltage is further reduced with respect to the case of sinusoidal envelope. Thereby, the number of switching cycles is increased, in which there is no power transfer towards the output and, therefore, the dead zone of the current absorbed by the network widens, with the consequential increase of THD and further reduction of PF.

A further disadvantage is that as the input voltage Vin varies, the excursion Ton is greater for a fixed power level. Therefore, the variation of the output voltage of the error amplifier will also be greater than expectations from a system which does not have the aforesaid distortion (e.g., in the case of "peak current mode" control). This should be considered in the PFC stage design, otherwise the risk exists to affect the limits of the dynamics allowed at the output of the error amplifier and, therefore, to lose the regulation of the output voltage.

A last negative consequence of this variation of the output level of the error amplifier occurs by closing the voltage loop. In fact, a ripple double the network frequency which always overlaps the continuous level of said voltage, and which is due to the ripple of the output voltage and to the not null gain of the error amplifier at that frequency, determines a modulation of Ton. It is known from theory that this modulation is translated into a 3rd harmonic distortion of the peak current envelope, the quantity of which is inversely proportional to the continuous level of the error amplifier output. Hence, a greater excursion of said level produces a greater variation of THD to the variation of the input voltage.

Figure 3:
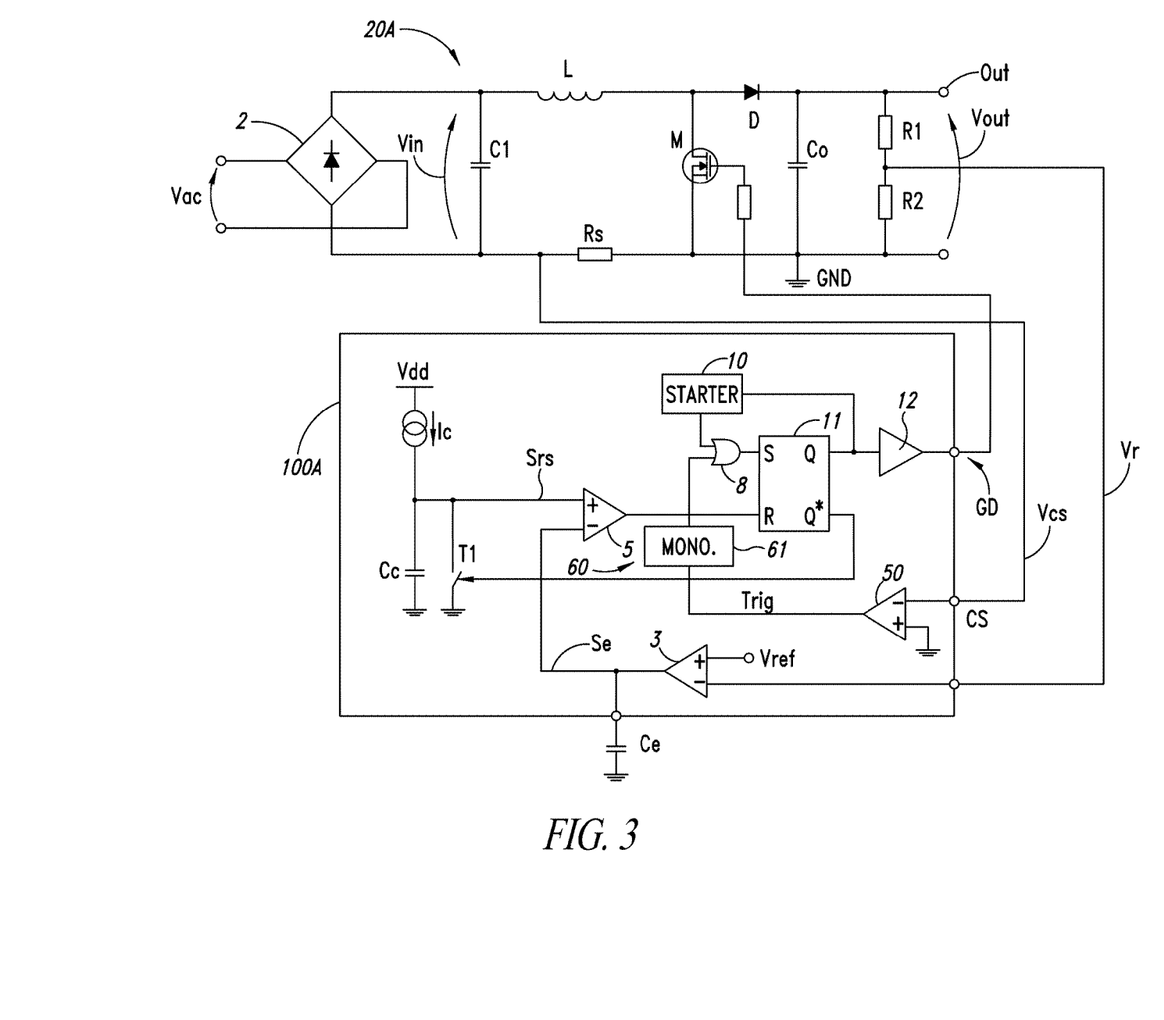
FIG. 3 shows a control device of a switching power supply in accordance with a first embodiment of the disclosure.

With reference to FIG. 3, a control device 100A of a switching power supply in accordance with a first embodiment of the present disclosure is shown. The power supply comprises a converter 20A, preferably a boost converter, having an input alternating supply voltage Vac and a regulated voltage Vout at the output terminal Out. The converter 20A comprises a switch M, preferably a MOS power transistor and the control device 100A is adapted to control the on time period Ton and the off time period Toff of said switch M at each cycle Tsw. The device 100A comprises a ramp generator, including elements Ic, Cc, T1, adapted to generate a ramp voltage Srs and turn-off circuitry having elements 5, 11, 12 adapted to determine the final instant of the on period Ton of switch M by crossing said ramp voltage Srs with a first voltage Se. A current detector, preferably a resistance Rs of the converter 20A, is adapted to detect the value of the current Ics flowing through at least one element L, M, of the converter, i.e., the current flowing through the inductance L or through the transistor M.

A zero crossing detector 50 is provided and is adapted to detect at least one pair of first Z1 and second Z2 zero crossings of the signal Vcs representative of the current flowing through at least one element L, M of the converter for each switching cycle Tsw, said second zero crossing Z2 immediately following the first zero crossing Z1 and occurring in opposite direction with respect to the first zero crossing Z1. The control device 100A comprises a synchronizer 60 adapted to synchronize the start Tin of the on time period Ton with each second zero crossing Z2 of the first signal Vcs.

As used herein, "synchronize" and "synchronizer" do not require any strictly simultaneous operations. Instead, the start Tin of the on time period Ton and the second zero crossing Z2 may be approximately synchronized in that the start Tin may be somewhat delayed with respect to the second zero crossing Z2 due to small propagation delays through the zero crossing detector 50, synchronizer 60, OR gate 8, flip-flop 11, driver 12, and the switch M.

In particular, the synchronizer 60 is adapted to synchronize the start Tslope of the ramp voltage Srs with the second zero crossing Z2 of the signal Vcs representative of the current flowing through at least one element of the converter.

The boost converter 20A comprises a full-wave diode rectifier bridge 2 having an input supply voltage Vac, a capacitor C1 (which serves as a high frequency filter) having first and second terminals, respectively connected to the diode bridge 2 and to ground GND by the resistance Rs, across which the voltage Vin exists, an inductance L connected to the first terminal of the capacitor C1, the MOS power transistor M having the drain terminal connected to a terminal of the inductance L downstream of the latter and having the source terminal connected to ground GND, a diode D having the anode connected to the common terminal of the inductance L and the transistor M and the cathode connected to a first terminal of a capacitor Co having a second terminal connected to ground GND. The boost converter 20A generates an output direct voltage Vout across the capacitor Co which is higher than the maximum peak supply voltage, typically 400 V for systems powered by a European power line or universal power line. Such a voltage Vout will be the input voltage of the DC-DC converter connected to the PFC.

The control device 100A should keep the output voltage Vout at a constant value by means of a feedback control action. The control device 100A comprises an operating error amplifier 3 adapted to compare a portion of the output voltage Vout, i.e., the voltage Vr given by Vr=R2×Vout/(R2+R1) (where the resistances R1 and R2 are connected in series to each other and the series is arranged in parallel to the capacitor Co) with a reference voltage Vref, e.g., of the value of 2.5 V, and generates an output error signal Se across a capacitor Ce connected between the output of the amplifier 3 and ground GND.

The error signal Se is sent to the inverting input of a PWM comparator 5 while the signal Srs exists at the non-inverting input; the signal Srs is a voltage ramp across a capacitor Cc powered by a current generator Ic in the time periods wherein the switch T1 is open. If the signals Srs and Se are equal, the comparator 5 sends a signal to a control block that includes elements 8, 11, 12 adapted to control the transistor M and which, in this case, turns it off. Elements 8, 11, 12 comprise an OR gate 8 having an input connected to a starter 10, adapted to send a signal to the OR gate 8 at the initial time instant; the output signal S of the OR gate 8 is the set input S of a set-reset flip-flop 11 having another input R which is the output signal of the comparator 5, and having an output signal Q. The signal Q is sent to the input of a driver 12 which controls the turn-on or turn-off of the transistor M by means of the signal GD while the signal Q*, i.e., the negated signal Q, controls the opening and closing of switch T1.

The zero crossing detector 50 comprises a comparator having inputs for receiving the voltage Vcs and the ground GND and being, adapted to compare the voltage Vcs across resistance Rs with the ground GND and adapted to emit an output signal Trig in response to said comparison. The synchronizer 60 includes a monostable circuit 61 having at the input the signal Trig and being adapted to emit an output signal which is at the input of the OR gate 8; the OR gate 8 emits the signal S, i.e., the set signal of the flip-flop 11. In particular, the signal Trig changes its logic level from low to high and vice versa at each zero crossing Z1, Z2 of the voltage Vcs per switching cycle Tsw, while the monostable circuit 61 only allows the impulse signal S to be sent when the signal Vcs crosses the zero Z2 for the second time.

In accordance with a first embodiment of the disclosure, with respect to the circuit schematic in FIG. 3, a resistance Rs is introduced on the path toward ground GND of the current; the inductor current Ics flows through this resistance, whereby such a current is shown in scale Rs by the drop of voltage Vcs (negative with respect to ground) on said resistance. A current sensing system of the inductor is typically used for safety purposes to prevent the peak currents from reaching values dangerous for the power elements of the boost in the case of operation disturbances. Hence, in general, the addition of this element is not an additional cost for the control device 100A.

Again in accordance with the first embodiment of the disclosure, the comparator of the zero crossing detector 50 has its non-inverting input connected to ground GND and the inverting input connected to the resistance Rs and is adapted to compare the voltage Vcs across the resistance R—inverted image of the inductor current $I_L$—with the ground GND.

Figure 4:
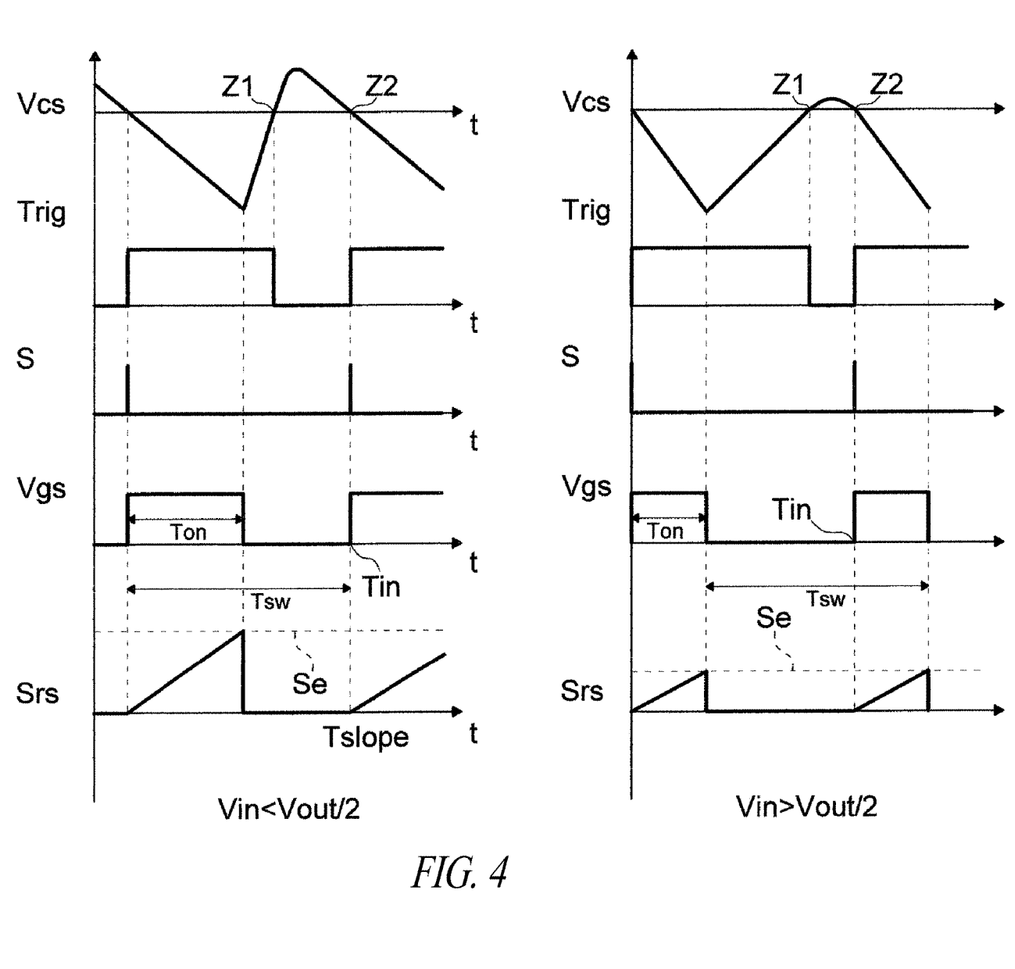
FIG. 4 shows the time diagrams of some signals involved in the circuit in FIG. 3 if Vin<Vout/2 or Vin>Vout/2.

FIG. 4 shows the time diagrams of some signals involved in the circuit in FIG. 3, i.e., the voltage Vgs between the gate and source terminals of the transistor M, the voltage Vcs, the ramp voltage Srs, the set signal S and the signal Trig.

As shown in FIG. 4, the signal Trig changes status at each zero crossing of the voltage Vcs; therefore the signal Trig goes to the low logic status, with the first zero crossing of the voltage Vcs (indicated by Z1), and the signal Trig goes to the high logic status with the next second zero crossing of the voltage Vcs (indicated with Z2). The signal S is always zero except when the voltage Vcs crosses the zero Z2 at the instant Tin; in fact, the signal Trig controls a monostable circuit sensitive to the positive edges which, therefore, only changes status at the second zero crossing of the voltage Vcs, i.e., when the signal Trig goes from the low logic level to the high logic level. This allows the set impulse S to be sent to flip-flop 11 which, by means of the signal Q* (the negated signal Q) will open the switch T1. The instant Tin will coincide with the start instant Tslope of the voltage ramp Srs.

Figure 5:
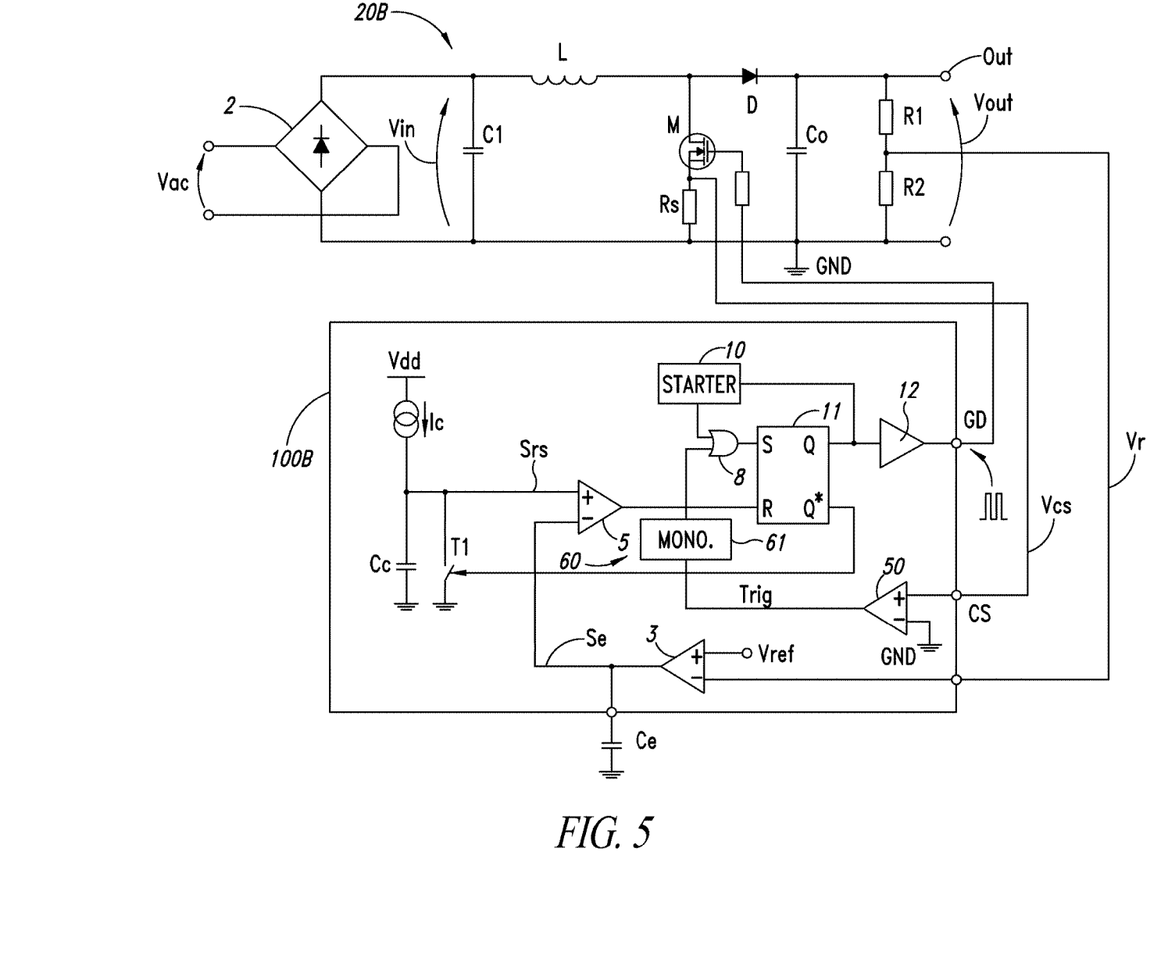
FIG. 5 shows a control device of a switching power supply in accordance with a variant of the first embodiment of the disclosure.

A second embodiment of the disclosure, including a control device 100B, is shown in FIG. 5. The primary difference in the FIG. 5 circuit with respect to the circuit scheme in FIG. 3 is that the resistance Rs of the converter 20B is placed in series with the source terminal of transistor M, thereby only sensing the part of the inductor current $I_L$ during the conduction step of the transistor M.

In addition, in the control device 100B of FIG. 5, the comparator of the zero crossing detector 50 has its non-inverting input connected to the resistance Rs and the inverting input connected to ground GND and is adapted to compare the voltage across the resistance Rs, representative of the current circulating through the switch M, with the ground GND.

Figure 6:
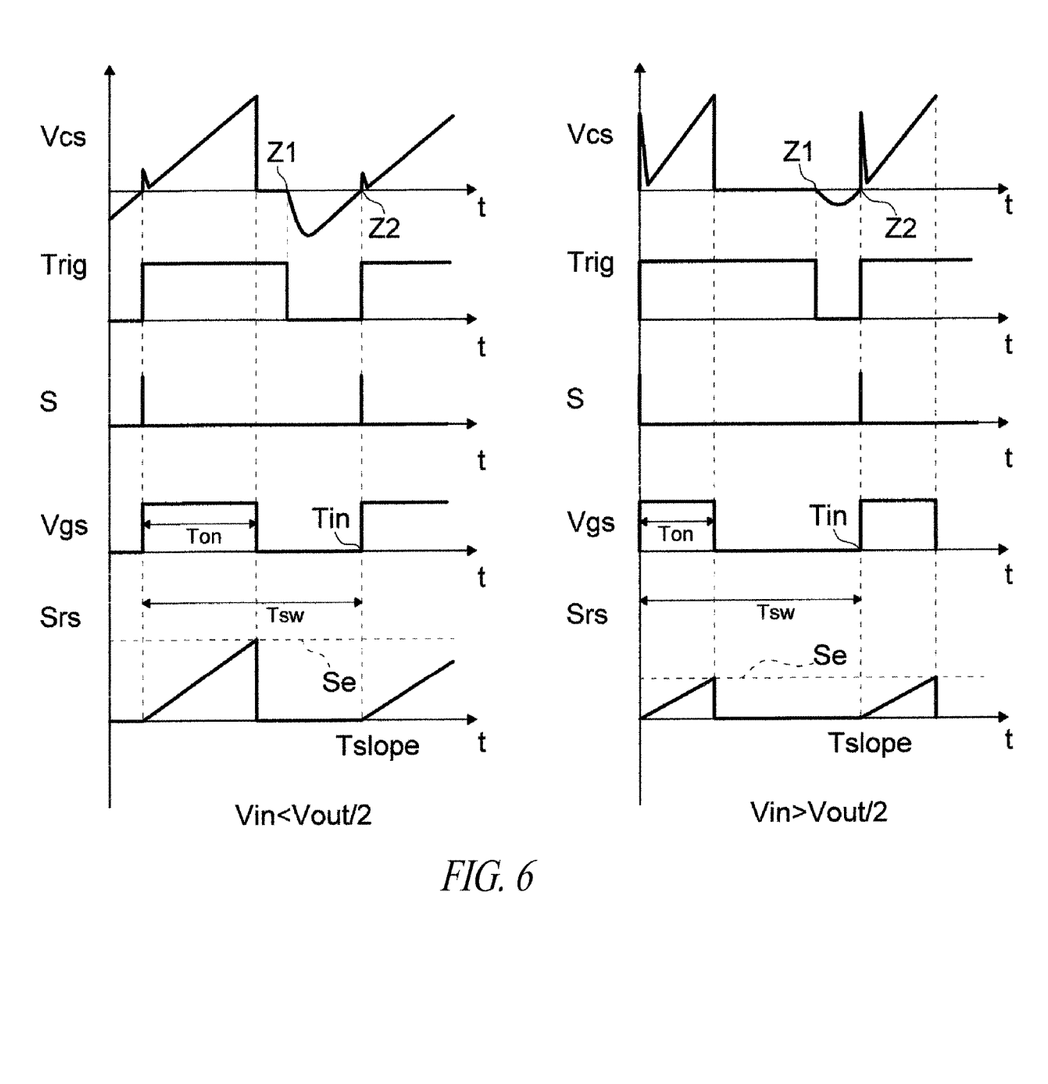
FIG. 6 shows the time diagrams of some signals involved in the circuit in FIG. 5 if Vin<Vout/2 or Vin>Vout/2.

FIG. 6 shows the time diagrams of some signals involved in the circuit in FIG. 5, i.e., the voltage Vgs between the gate and source terminals of the transistor M, the voltage Vcs, the ramp voltage Srs, the set signal S and the signal Trig.

Even for the control device 100B of the second embodiment of the disclosure, the signal Trig changes status at each zero crossing of the voltage Vcs; therefore the signal Trig goes to the low logic status, with the first zero crossing of the voltage Vcs (indicated by Z1), and the signal Trig goes to the high logic status with the next second zero crossing of the voltage Vcs (indicated with Z2). The signal S is always zero except when the voltage Vcs crossings the zero Z2 at the instant Tin; in fact, the signal Trig controls the monostable circuit 61 which only changes status at the second zero crossing of the voltage Vcs, i.e., when the signal Trig goes from the low logic level to the high logic level. This allows the set impulse S to be sent to the flip-flop 11 which, by means of the signal Q* (the negated signal Q) will open the switch T1. The instant Tin will coincide with the start instant Tslope of the voltage ramp Srs.

When transistor M is turned on, a disturbance may flow on the resistance Rs, which overlaps the useful signal representing the inductor current. Such a disturbance, which occurs as a positive spike called "leading-edge spike" derives from two fundamental contributions: the first is the charging current of the gate capacitance, the second is the discharge current of the parasitic capacitance of the drain terminal of the MOS M. Both the currents flow through the resistance Rs going to ground GND, whereby they generate a positive signal, precisely the leading-edge spike. This is particularly apparent when the voltage between the drain and source terminals of transistor M is positive at turning on, i.e., for Vin>Vout/2, because the discharge current of the drain terminal is typically predominant. However, in this case, the spike would not alter the operation of the circuit because the signal on Rs would be positive in any case. However, in the presence of a significant gate charging current, the spike could also be significant if Vin<Vout/2 and anticipate the triggering of the ramp.

With the control device 100B in accordance with the second embodiment of FIG. 5, any leading-edge spikes in the voltage Vcs are irrelevant as they could only confirm the start of the conduction time period Ton for the MOS transistor M.

Figure 7:
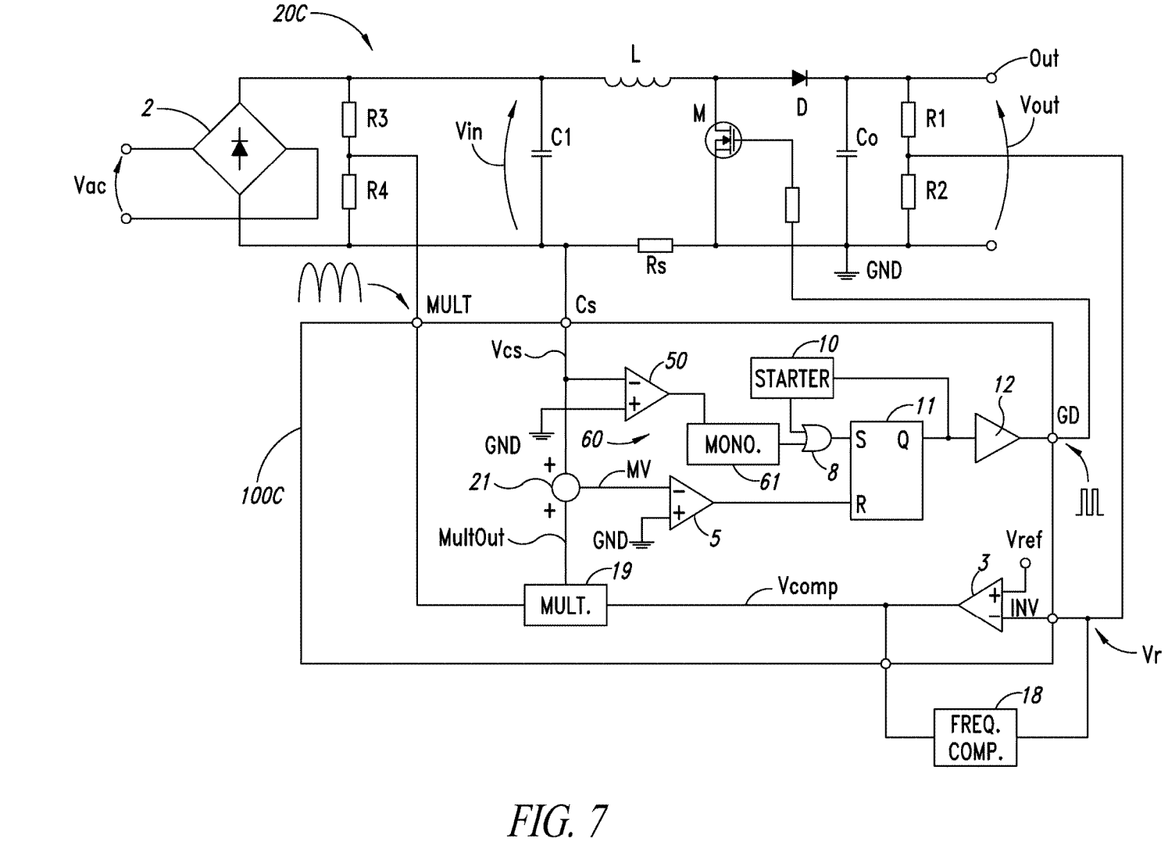
FIG. 7 shows a control device of a switching power supply in accordance with a second embodiment of the disclosure.

With reference to FIG. 7 a control device 100C and boost converter 20C of a switching power supply in accordance with a third embodiment of the present disclosure is shown. The converter 20C comprises a switch M, preferably a MOS power transistor and the control device 100C is adapted to control the on time period Ton and the off time period Toff of said switch M at each cycle Tsw. Unlike the converters 20A, 20B, the converter 20C includes a resistive divider, consisting of the series of two resistances R3, R4 connected in parallel to a capacitor C1, that is configured to provide a voltage MULT. Means are provided, preferably a resistance Rs, adapted to detect the value of the current Ics flowing through at least one element L, M of the converter, i.e., the current flowing through inductance L or that which flows in transistor M. The signal Vcs, which is a ramp voltage, is used to determine the duration of the on time Ton of switch M.

As with the other control devices 100A, 100B, the zero crossing detector 50 of the control device 100C is adapted to detect at least one pair of first Z1 and second Z2 zero crossings of the signal Vcs representative of the current flowing through at least one element L, M of the converter for each switching cycle Tsw, said second zero crossing Z2 immediately following the first zero crossing Z1 and occurring in opposite direction with respect to the first zero crossing Z1. The control device 100C comprises the synchronizer 60 which is adapted to synchronize the start Tin of the on time period Ton with each second zero crossing Z2 of the first signal Vcs. The final instant Tfin of the time period Ton is determined by a multiplier 19 having inputs couple to receive the signal MULT deriving from the resistive divider consisting of the series of two resistances R3, R4 and a signal Vcomp deriving from the error amplifier 3 adapted to compare the voltage Vref at the non-inverting input terminal with the voltage Vr at the inverting input terminal. The device of FIG. 7 also includes frequency compensation means 18, preferably a capacitor outside the control device 100C, connected between the output terminal and the inverting input terminal INV. The signal MultOut produced by multiplying the signals MULT and Vcomp is added to the signal Vcs by the adder 21 and the sum is compared with ground GND by a PWM comparator 5; the output signal of the comparator 5 is the reset signal R of the flip-flop 11 and determines the final instant Tfin of the time period Ton.

The boost converter 20C comprises a full-wave diode rectifier bridge 2 having an input supply voltage Vac, a capacitor C1 (which serves as a high frequency filter) having a terminal connected to the diode bridge 2 and the other terminal connected to ground GND by the resistance Rs and across which a voltage Vin exists, an inductance L connected to a terminal of the capacitor C1, a MOS power transistor M having the drain terminal connected to a terminal of the inductance L downstream of the latter and having the source terminal connected to ground GND, a diode D having the anode connected to the common terminal of the inductance L and the transistor M, and the cathode connected to a capacitor Co having the other terminal connected to ground GND. The boost converter 20C generates an output direct voltage Vout across the capacitor Co which is higher than the maximum peak supply voltage, typically 400 V for systems powered by means of European power line or universal power line. Such a voltage Vout will be the input voltage of the DC-DC converter connected to the PFC.

The control device 100C should keep the output voltage Vout at a constant value by means of a feedback control action. The control device 100C comprises an operating error amplifier 3 adapted to compare a portion of the output voltage Vout, i.e., the voltage Vr given by Vr=R2×Vout/(R2+R1) (where the resistances R1 and R2 are connected in series to each other and the series is arranged in parallel to the capacitor Co) with a reference voltage Vref, e.g., of the value of 2.5 V, and generates the output error signal Vcomp.

The error signal Vcomp is multiplied by the signal MULT and the signal MultOut at the output from the multiplier 19 is added to the signal Vcs; the sum MV of the two signals is sent to the inverting input of PWM comparator 5 while the non-inverting input is at ground GND. If the signals MV and ground GND are equal, the comparator 5 sends a signal to a control block that includes elements 8, 11, 12 adapted to control the transistor M and which, in this case, turns it off. The control block comprises a OR gate 8 having an input connected to a starter 10, adapted to send a signal to the OR gate 8 at the initial time instant; the output signal S of the OR gate 8 is the set input S of a set-reset flip-flop 11 having another input R which is the output signal of the comparator 5, and having an output signal Q. The signal Q is sent to the input of a driver 12 which controls the turn-on or turn-off of M by means of the signal GD.

The zero crossing detector 50 includes a comparator having at the input the voltage Vcs and the ground GND and being adapted to compare the voltage Vcs across the resistance Rs with the ground GND and adapted to emit an output signal Trig in response to said comparison. The synchronizer 60 comprises the monostable circuit 61 having at the input the signal Trig and being adapted to emit an output signal which is at the input of the OR gate 8; the OR gate 8 emits the signal S, i.e., the set signal of the flip-flop 11. In particular, the signal Trig changes its logic level from low to high and vice versa at each zero crossing Z1, Z2 of the voltage Vcs per switching cycle Tsw, while the monostable circuit 61 only allows the impulse signal S to be sent when the signal Vcs crosses the zero Z2 for the second time.

Like the converter 20A in FIG. 1, the converter 20C of the third embodiment includes a resistance Rs on the path toward ground GND of the current; the inductor current Ics flows across this resistance, whereby such a current is shown in scale Rs by the drop of voltage Vcs (negative with respect to ground) on said resistance. A current sensing system of the inductor is typically used for safety purposes to prevent the peak currents from reaching values dangerous for the power elements of the boost in the case of operations disturbances. Hence, the addition of this element is not an additional cost for the converter 20C.

Again in accordance with the second embodiment of the disclosure, the comparator of the zero crossing detector 50 has its non-inverting input connected to ground GND and the inverting input connected to the resistance Rs and is adapted to compare the voltage Vcs on the resistance Rs—inverted image of the inductor current $I_L$—with the ground GND.

Figure 8:
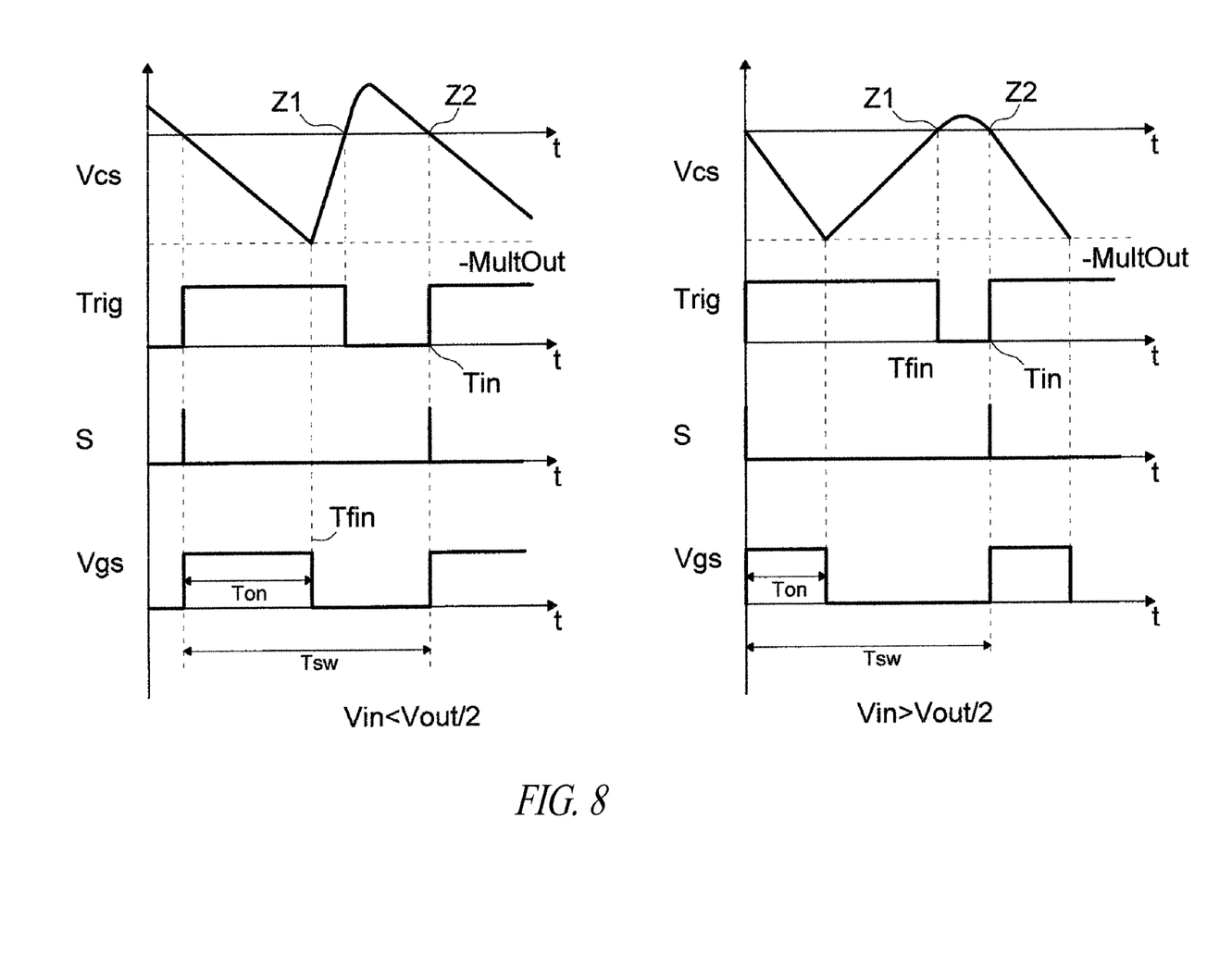
FIG. 8 shows the time diagrams of some signals involved in the circuit in FIG. 7 if Vin<Vout/2 or Vin>Vout/2.

FIG. 8 shows the time diagrams of some signals involved in the circuit in FIG. 7, i.e., the voltage Vgs between the gate and source terminals of the transistor M, the voltage Vcs, the set signal S and the signal Trig.

As shown in FIG. 7 the signal Trig changes status at each zero crossing of the voltage Vcs; therefore the signal Trig goes to the low logic status, with the first zero crossing of the voltage Vcs (indicated by Z1), and the signal Trig goes to the high logic status with the next second zero crossing of the voltage Vcs (indicated with Z2). The signal S is always zero except when the voltage Vcs crosses the zero Z2 at the instant Tin; in fact, the signal Trig controls the monostable circuit 60 sensitive to positive edges which, therefore, only changes status at the second zero crossing of the voltage Vcs, i.e., when the signal Trig goes from the low logic level to the high logic level.

A fourth embodiment of the disclosure (FIG. 9) includes a boost converter 20D and a control device 100D. The converter 20D has the resistance Rs placed in series with the source terminal of transistor M, thereby only sensing the part of the inductor current $I_L$ during the conduction step of the transistor M.

Figure 9:
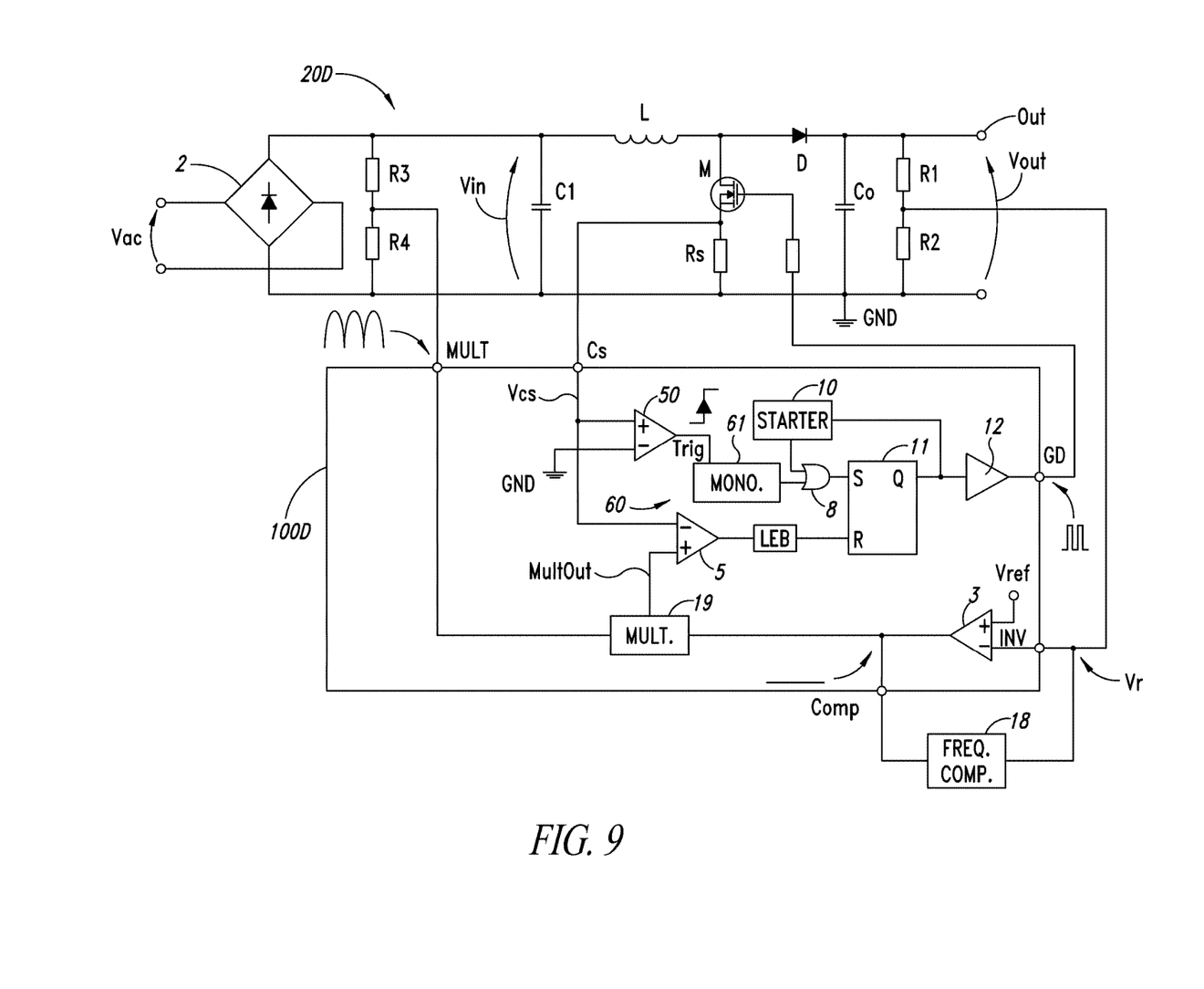
FIG. 9 shows a control device of a switching power supply in accordance with a variant of the second embodiment of the disclosure.

The control device 100D of FIG. 9 comprises the zero crossing detector 50 which comprises the comparator which has its non-inverting input terminal connected to the resistance Rs and the inverting input terminal connected to ground GND and is adapted to compare the voltage across the resistance Rs representative of the current circulating through the switch M with the ground GND. The control device 100D does not include the adder 21 of the control device 100C, as the PWM comparator 5 directly compares the voltage MultOut at the non-inverting input terminal with the voltage Vcs at the inverting input terminal and if the voltages Vcs and MultOut are equal, the reset signal R 11 is sent to the input of the flip-flop to determine the final instant Tfin of the on period Ton of the transistor M. A delay block LEB may also be provided for sending the reset signal R from the output of the PWM comparator 5 to the input R of the flip-flop 11.

Figure 10:
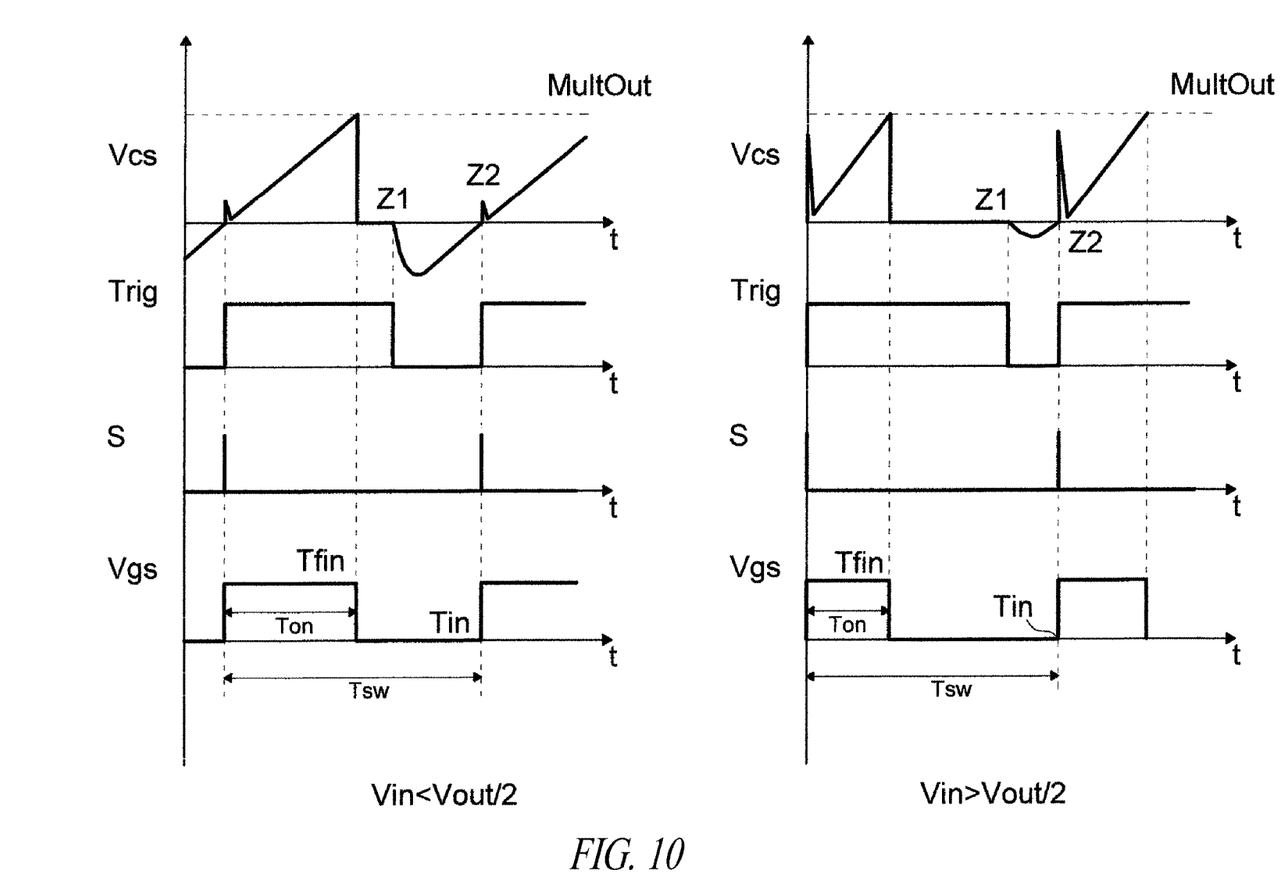
FIG. 10 shows the time diagrams of some signals involved in the circuit in FIG. 9 if Vin<Vout/2 or Vin>Vout/2.

FIG. 10 shows the time diagrams of some signals involved in the circuit in FIG. 9, i.e., the voltage Vgs between the gate and source terminals of the transistor M, the voltage Vcs, the set signal S and the signal Trig.

Even for the control device 100D, the signal Trig changes status at each zero crossing of the voltage Vcs; therefore the signal Trig goes to the low logic status, with the first zero crossing of the voltage Vcs (indicated by Z1), and the signal Trig goes to the high logic status with the next second zero crossing of the voltage Vcs (indicated with Z2). The signal S is always zero except when the voltage Vcs crossings the zero Z2 at the instant Tin; in fact, the signal Trig controls a monostable circuit which only changes status at the second zero crossing of the voltage Vcs, i.e., when the signal Trig goes from the low logic level to the high logic level.

When transistor M is turned on, a disturbance may flow through the resistance Rs, which overlaps the useful signal representing the inductor current. Such a disturbance, which occurs as a positive spike called "leading-edge spike" derives from two fundamental contributions: the first is the charging current of the gate capacitance, the second is the discharge current of the parasitic capacitance of the drain terminal of the MOS M. Both the currents flow through the resistance Rs going to ground GND, whereby they generate a positive signal, precisely the leading-edge spike. This is particularly apparent when the voltage between the drain and source terminals of transistor M is positive at turning on, i.e., for Vin>Vout/2, because the discharge current of the drain terminal is typically predominant. However, in this case, the spike would not alter the operation of the circuit because the signal across Rs would be positive in any case. However, in the presence of a significant gate charging current, the spike could also be significant if Vin<Vout/2.

With the control device in accordance with the variant of the second embodiment of the disclosure, any leading-edge spikes in the voltage Vcs are irrelevant as they could only confirm the start of the on time period Ton for the transistor MOS M.

The control devices 100A-D do not require any additional zero detector 1 adapted to detect the zeros of inductor current $I_L$ in order to turn the MOSFET M on, and thus the converters 20A-D are not required to include an auxiliary winding to provide an auxiliary current corresponding to the inductor current $I_L$.

The control device 100 is typically integrated in a silicon chip except the capacitor Ce or the frequency compensator 18 which are generally outside the integrated circuit.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control device for controlling a switching converter that includes a switch and a sense resistor coupled to the switch, said control device comprising:
a zero crossing detector configured to:
receive from the sense resistor of the switching converter an input signal indicative of a current though the sense resistor of the switching converter,
detect a first zero crossing of the current though the sense resistor of the switching converter by detecting a zero crossing of said input signal, the first zero crossing occurring after the switch is turned off and while the switch is off and in a same switching cycle as the turn off of the switch,
detect a second zero crossing of the current though the sense resistor of the switching converter, the second zero crossing immediately following the first zero crossing and occurring in an opposite direction with respect to the first zero crossing, the second zero crossing occurring in the same switching cycle of the switch as the first zero crossing, and
output a detection signal in response to detecting said second zero crossing; and
a synchronizer configured to start an on time period of the switch in response to the detection signal indicating that the zero crossing detector has detected said second zero crossing of said input signal.

2. The control device according to claim 1, further comprising: a ramp generator configured to generate a ramp voltage; and a comparator configured to determine a final instant of the on time period of the switch by comparing said ramp voltage with a first voltage, said synchronizer being configured to synchronize an initial instant of the ramp voltage with the second zero crossing of said input signal.

3. The control device according to claim 2, wherein said synchronizer includes:
a monostable device configured to output a start pulse in response to the detection signal indicating that said zero crossing detector has detected said second zero crossing; and
a flip-flop having:
an input coupled to an output of the monostable device;
a first output configured to provide a first control signal that starts the on time period of said switch in response to the start pulse output by the monostable device; and
a second output configured to provide a second control signal to control the initial instant of the ramp voltage.

4. The control device according to claim 3, wherein said ramp generator includes:
a capacitor;
a current generator configured to supply a direct current to said capacitor; and
a further switch arranged in parallel to said capacitor, said further switch being configured to be controlled by the second control signal.

5. The control device according to claim 2, further comprising a capacitor and an error amplifier having a first input configured to receive a reference voltage, a second input configured to receive from the switching converter a voltage proportional to a regulated output voltage, and an output configured to provide the first voltage across the capacitor.

6. The control device according to claim 5, wherein the zero crossing detector, synchronizer, ramp generator, comparator, and error amplifier are integrated on a semiconductor chip and the capacitor is outside the semiconductor chip.

7. The control device according to claim 1, comprising: an error amplifier having a first input configured to receive a reference voltage, a second input configured to receive from the switching converter a voltage proportional to a regulated output voltage, and an output configured to provide an error signal; a multiplier configured to provide a multiplied signal by multiplying the error signal by a signal representative of a rectified input voltage of the switching converter; and a comparator configured to determine a final instant of the on time period of the switch by comparing said input signal with the multiplied signal.

8. The control device according to claim 1, wherein said synchronizer includes a monostable device having an input coupled to an output of said zero crossing detector.

9. A power device, comprising: a switching converter configured to produce a regulated voltage from an input alternating supply voltage, the switching converter including a switch and a sense resistor coupled to the switch, the sense resistor being configured provide a first signal indicative of a current though the sense resistor of the switching converter; and a control device configured to control an on time period and an off time period of said switch for each of plural cycles, said control device including: a zero crossing detector configured to: receive from the switching converter the first signal, detect a first zero crossing of the current though the sense resistor of the switching converter by detecting a zero crossing of said first signal, the first zero crossing occurring after the switch is turned off and while the switch is off and in a same switching cycle as the turn off of the switch, detect a second zero crossing of the current though the sense resistor of the switching converter, the second zero crossing immediately following the first zero crossing and occurring in an opposite direction with respect to the first zero crossing, the second zero crossing occurring in the same switching cycle of the switch as the first zero crossing, and output a detection signal in response to detecting said second zero crossing; and a synchronizer configured to start the on time period of the switch in response to the detection signal indicating that the zero crossing detector has detected said second zero crossing of said first signal.

10. The power device according to claim 9, wherein:
the switching converter includes a rectifier configured to produce a rectified supply voltage by rectifying the alternating supply voltage, a capacitor configured to filter the rectified supply voltage, and an inductor coupled with said capacitor and said switch; and
the switching converter is configured to provide, as said first signal, a voltage across said sense resistor corresponding to a current through the inductor.

11. The power device according to claim 9, wherein the switching converter includes a rectifier configured to produce a rectified supply voltage by rectifying the alternating supply voltage, and an inductor coupled with said switch, the sense resistor being placed in a current path extending between said switch and the rectifier and wherein the switching converter is configured to provide, as said first signal, a voltage across said resistance sense resistor corresponding to a current through said switch.

12. The power device according to claim 9, wherein the control device includes: a ramp generator configured to generate a ramp voltage; and a comparator configured to determine a final instant of the on time period of the switch by comparing said ramp voltage with a first voltage, said synchronizer being configured to synchronize an initial instant of the ramp voltage with the second zero crossing of said first signal.

13. The power device according to claim 12, wherein said synchronizer includes:
a monostable device configured to output a start pulse in response to the detection signal indicating that said zero crossing detector has detected said second zero crossing; and
a flip-flop having:
an input coupled to an output of the monostable device;
a first output configured to provide a first control signal that starts an on time period of said switch in response to the start pulse output by the monostable device; and
a second output configured to provide a second control signal to control the initial instant of the ramp voltage.

14. The power device according to claim 13, wherein said ramp generator includes:
a capacitor;
a current generator configured to supply a direct current to said capacitor; and
a further switch arranged in parallel to said capacitor, said further switch being configured to be controlled by the second control signal.

15. The power device according to claim 12, wherein the control device includes a capacitor and an error amplifier having a first input configured to receive a reference voltage, a second input configured to receive from the switching converter a voltage proportional to the regulated voltage; and an output configured to provide the first voltage across the capacitor.

16. The power device according to claim 9, wherein the control device includes: an error amplifier having a first input configured to receive a reference voltage, a second input configured to receive from the switching converter a voltage proportional to the regulated voltage, and an output configured to provide an error signal; a multiplier configured to provide a multiplied signal by multiplying the error signal by a signal representative of a rectified input voltage of the switching converter; and a comparator configured to determine a final instant of the on time period of the switch by comparing said first signal with the multiplied signal.

17. The power device according to claim 9, wherein said synchronizer includes a monostable device having an input coupled to an output of said zero crossing detector.

18. A power device, comprising:
a switching converter configured to produce a regulated voltage from an input alternating supply voltage and provide a first signal indicative of a current though a sense resistor of the switching converter, said switching converter including a switch; and
zero crossing means for:
receiving the first signal,
detecting a first zero crossing of the current though sense resistor of the switching converter by detecting a zero crossing of said first signal, the first zero crossing occurring after the switch is turned off and while the switch is off and in a same switching cycle as the turn off of the switch,
detecting a second zero crossing of the current though the sense resistor of the switching converter, the second zero crossing immediately following the first zero crossing and occurring in an opposite direction with respect to the first zero crossing, the second zero crossing occurring in the same switching cycle of the switch as the first zero crossing, and
providing a zero crossing signal that includes first and second indications corresponding respectively to the first and second zero crossings; and
control means for receiving the zero crossing signal, ignoring the first indication, and controlling a start of an on time period of the switch based on the second indication corresponding to the second zero crossing.

19. The power device according to claim 18, further comprising: a ramp generation means for generating a ramp voltage; and comparison means for setting a final instant of the on time period of the switch by comparing said ramp voltage with a first voltage, said control means also being for controlling an initial instant of the ramp voltage based on the second zero crossing.

20. The power device according to claim 19, wherein said control means include:
a monostable device configured to output a start pulse in response to the zero crossing signal indicating that said zero crossing detector has detected said second zero crossing; and
a flip-flop having:
an input coupled to an output of the monostable device; and
a first output configured to provide a first control signal that starts an on time period of said switch in response to the start pulse output by the monostable device; and
a second output configured to provide a second control signal to control the initial instant of the ramp voltage.

21. The power device according to claim 18, further comprising error amplifier means for proving an error signal based on a comparison of a reference voltage and a voltage proportional to the regulated voltage; multiplier means for providing a multiplied signal by multiplying the error signal by a signal representative of a rectified input voltage of the switching converter; and comparison means for determining a final instant of the on time period of the switch by comparing said first signal with the multiplied signal.

22. The power device according to claim 18, wherein said control means includes a monostable device having an input coupled to receive the zero crossing signal, the monostable device being configured to be triggered by the second indication without being triggered by the first indication.

23. The power device according to claim 18, wherein the switching converter includes a rectifier configured to produce a rectified supply voltage by rectifying the alternating supply voltage, and an inductor coupled with said switch, the sense resistor being placed in a current path extending between the switch and the rectifier, and wherein the switching converter is configured to provide, as said first signal, a voltage across said sense resistor based on a current through said switch.

* * * * *